United States Patent
Bresson et al.

(10) Patent No.: US 7,592,722 B2
(45) Date of Patent: Sep. 22, 2009

(54) GAS-COOLED GENERATOR

(75) Inventors: Michel Bresson, Belfort (FR); Dominique Chadouteau, Belfort (FR); Lennart Diestel-Feddersen, Brugg (CH); Alberto Izquierdo, Neuenhof (CH); René Meylan, Yverdon-les-Bains (CH)

(73) Assignee: Alstom Technology Ltd, Baden (CH)

( * ) Notice: Subject to any disclaimer, the term of this patent is extended or adjusted under 35 U.S.C. 154(b) by 157 days.

(21) Appl. No.: 11/368,101

(22) Filed: Mar. 3, 2006

(65) Prior Publication Data
US 2006/0197391 A1    Sep. 7, 2006

(30) Foreign Application Priority Data
Mar. 4, 2005    (CH) .................................. 0380/05

(51) Int. Cl.
*H02K 9/08* (2006.01)
(52) U.S. Cl. ............................. 310/58; 310/59; 290/1 B
(58) Field of Classification Search .................. 310/58, 310/52, 55, 56, 59; 340/565; 128/202, 203; 290/1 B
See application file for complete search history.

(56) References Cited

U.S. PATENT DOCUMENTS

| 3,643,119 | A | * | 2/1972 | Lukens ...................... 310/60 R |
| 3,831,160 | A |   | 8/1974 | Cronin et al. ............... 340/256 |
| 3,854,062 | A | * | 12/1974 | Winer et al. ............... 310/68 C |
| 3,858,069 | A | * | 12/1974 | Kuter et al. ............... 310/68 D |
| 4,745,315 | A |   | 5/1988 | Terry, Jr. et al. ............... 310/68 |
| 4,904,890 | A | * | 2/1990 | Archibald et al. ............. 310/59 |
| 5,365,133 | A | * | 11/1994 | Raad ......................... 310/68 D |
| 6,439,145 | B1 | * | 8/2002 | Mensch .................... 114/61.18 |
| 6,460,013 | B1 |   | 10/2002 | Nippes ....................... 702/183 |
| 6,499,967 | B2 | * | 12/2002 | Hansen ....................... 417/365 |
| 6,943,686 | B2 | * | 9/2005 | Allen ......................... 340/546 |
| 2004/0084976 | A1 | * | 5/2004 | Thiot .......................... 310/58 |
| 2005/0229928 | A1 | * | 10/2005 | Ivri et al. ............... 128/203.12 |

FOREIGN PATENT DOCUMENTS

| CA | 2 498 060 | 3/2004 |
| CA | 2 498 105 | 3/2004 |
| DE | 1 217 493 | 5/1966 |
| EP | 0 377 154 A1 | 7/1990 |
| JP | 05091695 | 4/1991 |
| JP | 08251871 | 9/1996 |
| WO | WO 2004/025316 | 3/2004 |
| WO | WO 2004/025811 | 3/2004 |

OTHER PUBLICATIONS

International Search Report for CH 00380/05 (4 pages) and brief translation thereof (1 page), Apr. 13, 2005.
European Search Report for EP 05 10 7160 (8 pages) and brief translation thereof (1 page), Feb. 13, 2006.

* cited by examiner

*Primary Examiner*—Dang D Le
(74) *Attorney, Agent, or Firm*—Darby & Darby

(57) ABSTRACT

A gas-cooled generator has a rotor rotatable about an axis, a stator surrounding the rotor concentrically and a rotating exciter connected to the rotor. The stator, rotor and exciter are arranged along the axis on a common base frame. A first cooler configured to cool the rotor and stator and second cooler configured to cool the exciter are connected to one another for the exchange of cooling gas via the base frame. At least one tube running in the base frame provides the connection between the first and second coolers.

18 Claims, 5 Drawing Sheets

GAS-COOLED GENERATOR

Priority is claimed to Swiss Patent Application No. CH 00380/05, filed on Mar. 4, 2005, the entire disclosure of which is incorporated by reference herein.

The present invention relates to the field of rotating machines. It refers to a gas-cooled generator having a rotor and a stator.

BACKGROUND

Gas-cooled, in particular air-cooled, generators in the power class of a few 100 MVA with a rotating exciter have long been offered by the applicant. Those details of these known generators which are critical for cooling are reproduced in FIGS. 1 to 3. The generator 10 of FIG. 1 is built on a stable box-shaped base frame 11 which is delimited laterally by continuous U-profiles and has bollards 54 which project laterally on the longitudinal sides and at which the generator 10 can be lifted by means of a crane or the like. The base frame 11 has fastened on it by means of a plurality of carrying rings 13 a hollow-cylindrical stator 12, the cylindrical inner space 17 of which receives a rotor, not illustrated, which is indicated in FIG. 1 by a generator shaft 35 carrying the rotor. The rotatable mounting of the rotor or generator shaft takes place by means of bearing blocks (34 in FIG. 5) which are fastened on the top side of the base frame 11 on carrying plates 18, 19 provided specifically for this purpose. In the assembled state, the stator 12 is surrounded by cooling-air chambers which are constructed from individual wall elements 22 (FIG. 1 shows only the lower part of the chambers divisible along a horizontal parting plane). The cooling-air chambers are connected partially to one another by means of connecting ducts running within the base frame 11 and partially to coolers arranged above the stator 12, thus giving rise to a cooling circuit which runs through the rotor and stator and the associated windings and air gaps and which includes the base frame 11 as part of the circuit.

According to FIGS. 2 and 3, that region of the base frame 11 which is assigned to the stator 12 is separated from the region following in the axial direction and assigned to a rotating exciter 24 by means of a transverse wall 25 which merges at each of the two ends into a bollard 54. In the exciter region of the base frame 11, two parallel intermediate walls 55 and 56 running in the axial direction separate two lateral cavities 20 and 21, between which is located a third, larger cavity which is itself subdivided in the middle by means of a transversely running intermediate wall 57 (see also FIG. 4, 5). The outer part of the middle, larger cavity is connected to the lateral cavities 20, 21 by means of (circular) perforations 16 in the intermediate walls 55, 56. The lateral cavities 20, 21 are connected to the stator region of the base frame 11 via corresponding perforations in the transverse wall 25. The middle, larger cavity is closed off at the top by means of a cover plate 14 which has two rectangular ports 15, 15' lying next to one another. Each of the two ports 15, 15' allows access into an underneath part region of the middle cavity.

As may be gathered from FIG. 3, above the port 15' the rotating exciter 24 is arranged, which discharges the cooling air flowing through it through the port 15' downward into the underneath cavity, from where it flows back to that region of the base frame 11 which lies below the stator 12. The exciter 24 receives the cooling air via an air supply hood 23 (FIG. 3) which is arranged above the port 15. According to the flow arrows depicted in the base frame 11 in FIGS. 2 and 3, cooling air passes out of the stator region of the base frame 11 through the perforations in the transverse wall 25 into the two lateral cavities 20, 21, from there through the perforations 16 in the intermediate walls 55, 56 into the outer part of the middle cavity, and from there through the port 15 upward into the air supply hood 23. The air supply hood 23 then ensures that the cooling air is fed axially into the exciter 24.

This type of routing of cooling air within the base frame 11 has the disadvantage that, because of the constantly changing diameters in the flow path, considerable pressure losses occur which impair the cooling-air stream and consequently the cooling efficiency.

SUMMARY OF THE INVENTION

An object of the present invention is to provide a modified generator of the type initially mentioned structurally in such a way that the cooling-air stream through the exciter is greatly increased and consequently the cooling of the exciter is improved considerably.

The present invention provides a gas-cooled generator that includes a rotor rotatable about an axis, a stator surrounding the rotor concentrically, a rotating exciter connected to the rotor, a common base frame, wherein the rotor, stator and exciter are disposed along the axis on the common base frame, at least one tube disposed in the base frame, a first cooler configured to cool the rotor and stator, and a second cooler configured to cool the exciter, wherein the first and second coolers are connected to one another via the at least one tube so as to enable an exchange of a cooling gas. Since tubes are used as far as possible for routing the cooling air through the exciter, a uniform diameter of the flow duct is achieved. The pressure losses can consequently be drastically reduced. Although supplying an exciter from the generator cooling circuit via independent ducts or tubes is known, in principle, from U.S. Pat. No. 4,904,890, nevertheless, there, the exciter is axially flanged, cantilevered, onto the generator housing, without being mounted on part of a common base frame.

A refinement of the invention is characterized in that the cooling gas is supplied to the exciter in the axial direction on the side facing away from the rotor, in that the cooling gas is led past the exciter in the axial direction on both sides in the base frame by means of two tubes, and in that the two tubes terminate within the base frame, on that side of the exciter which faces away from the rotor, in a common third tube which leads out of the base frame upward to the exciter. This refinement can be retrofitted particularly simply in generators of the known type, because the tubes can easily be led through the already existing cavities in the base frame without major changes.

For the undisturbed flow of cooling air, it is in this case particularly advantageous if differently oriented tubes are connected to one another by means of curved tube elbows, and the radius of curvature of the tube elbows is at its maximum in the case of a predetermined geometry of the base frame. It is likewise particularly beneficial if the hydraulic diameter of the tubes is at its maximum in the case of a predetermined geometry of the base frame.

The tube or tubes may, in principle, have any desired cross-sectional shape (rectangular, triangular, round, oval, etc.). It is particularly simple and effective, however, if the tube or tubes have a round cross section.

For reasons of stability, the tube or tubes are preferably screwed or welded to the base frame.

BRIEF DESCRIPTION OF THE DRAWINGS

The present invention will be explained in more detail below by means of exemplary embodiments, in connection with the drawing, in which.

DETAILED DESCRIPTION

Figure 1:
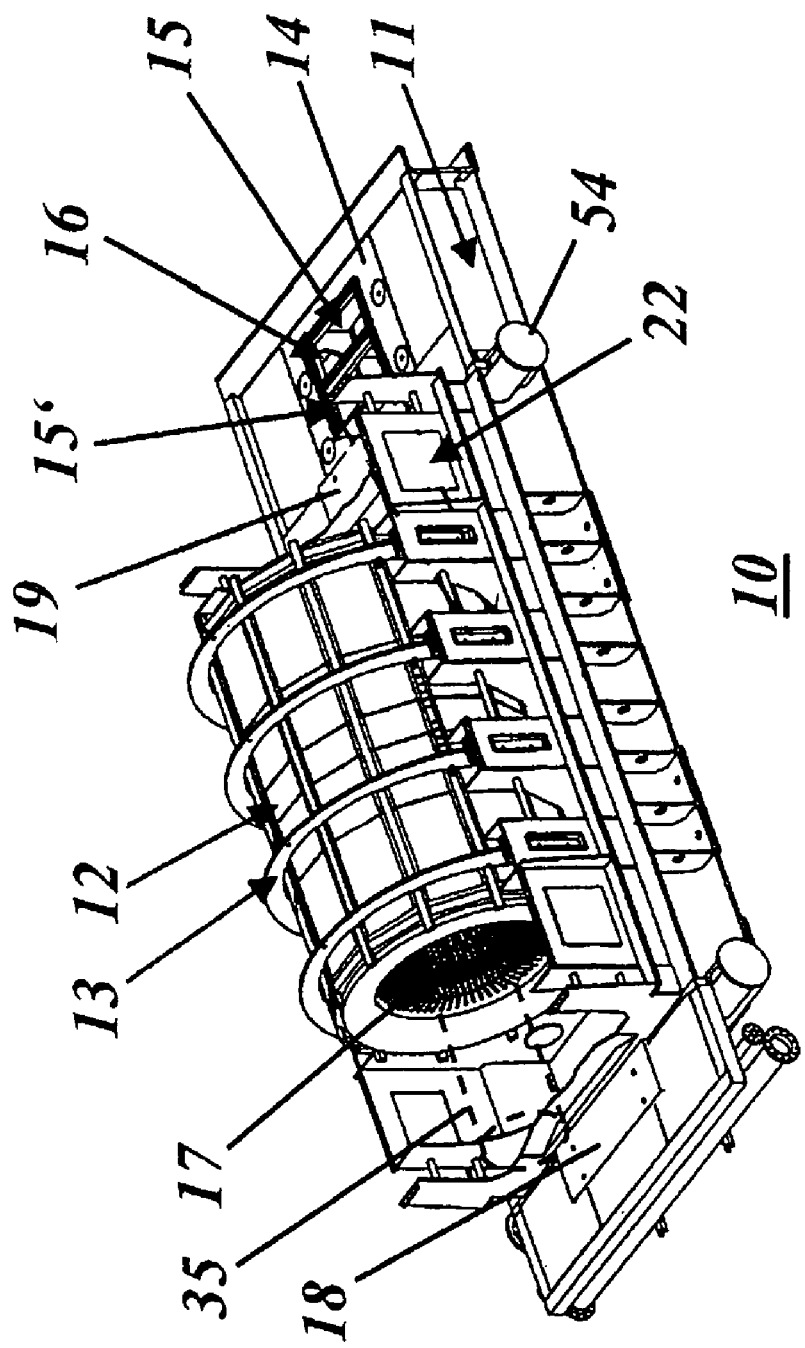
FIG. 1 shows a perspective side view of the lower part of a generator built on a base frame, with a rotating exciter, according to the prior art.
Figure 2:
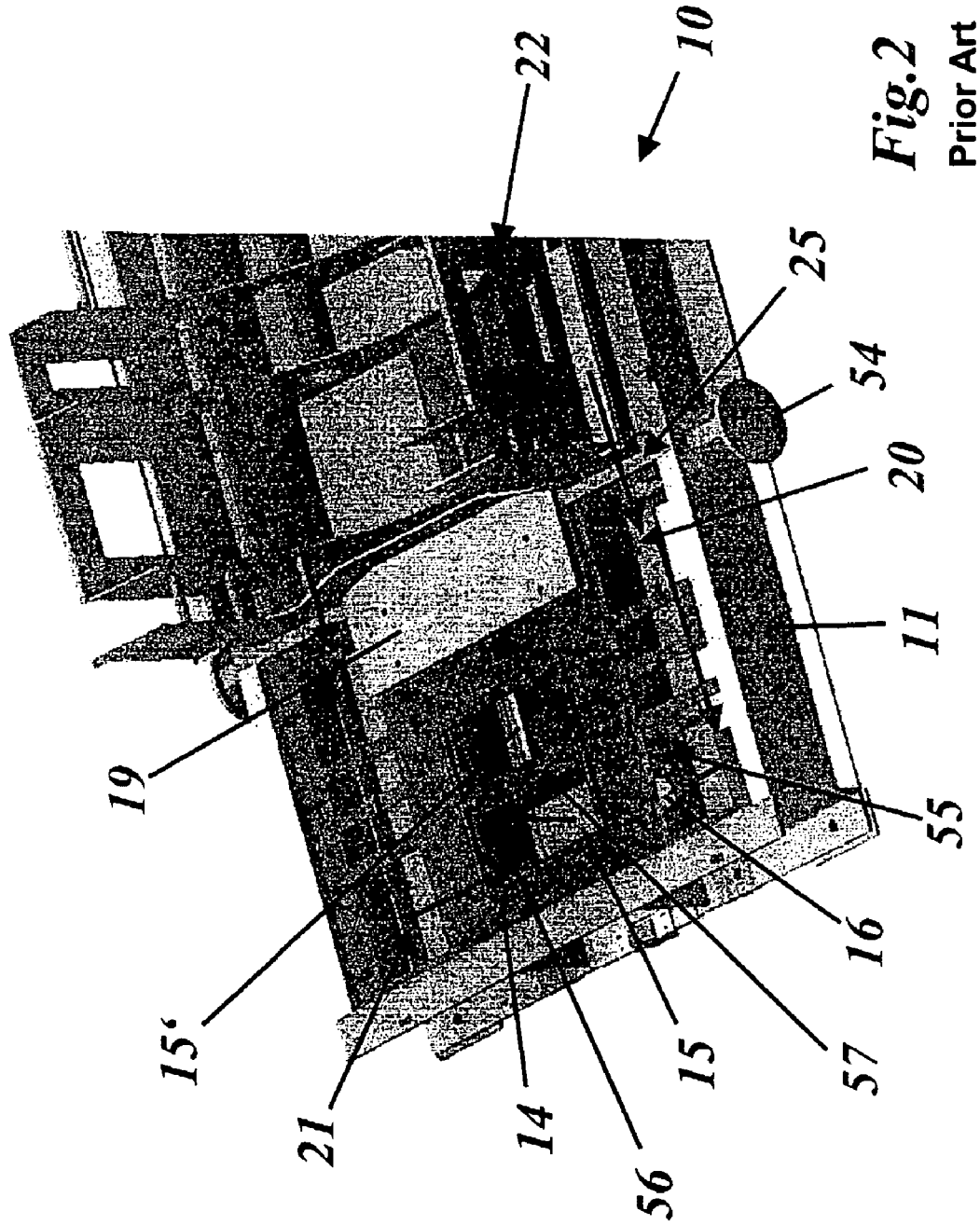
FIG. 2 shows an enlarged detail of that part of the base frame of the known generator from FIG. 1 which carries the exciter, with the cooling-air flow routed within the base frame in cavities.
Figure 3:
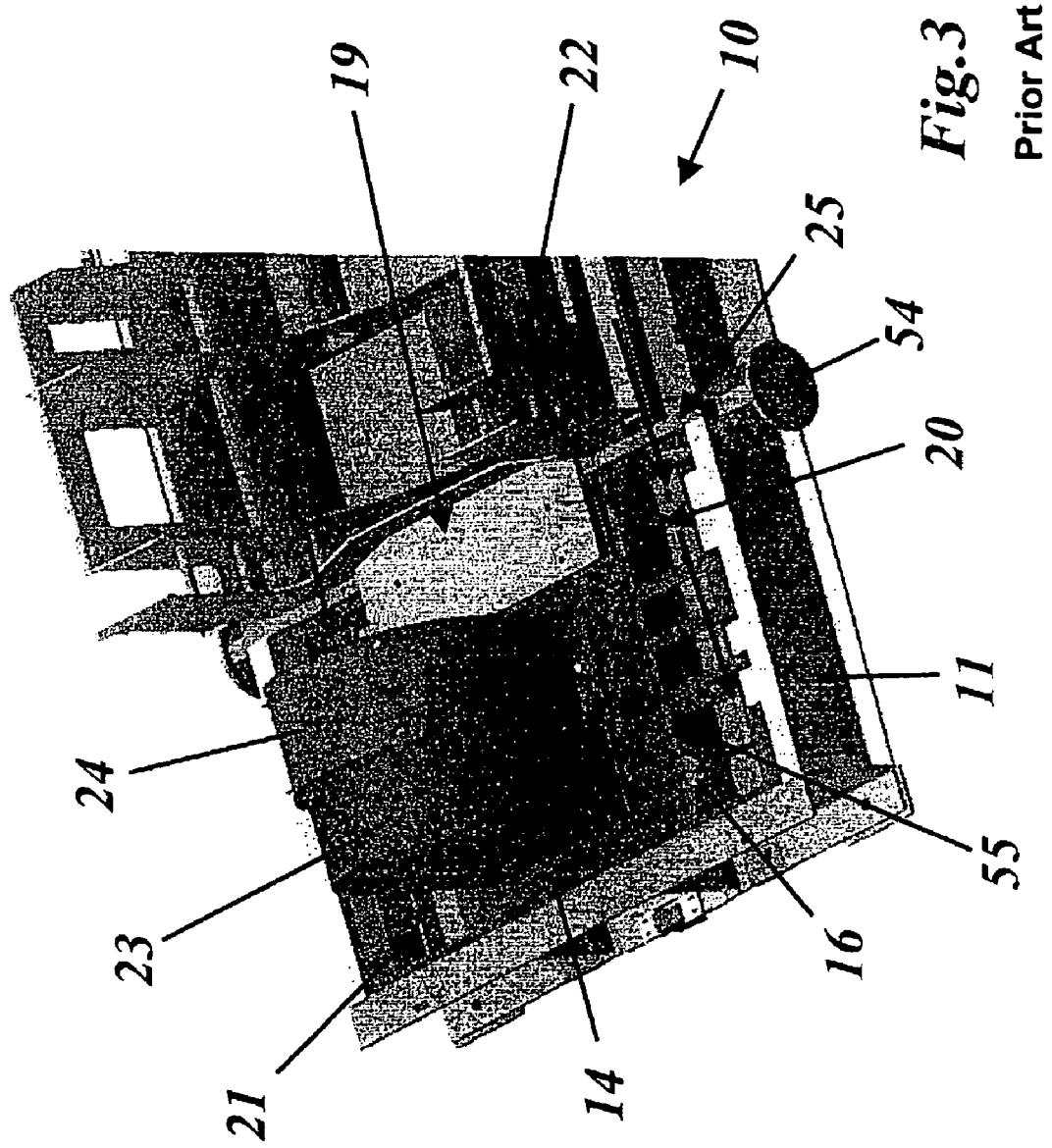
FIG. 3 shows an illustration, comparable to FIG. 2, of the exciter, mounted on the base frame, of the known generator, with the associated air supply hood.
Figure 4:
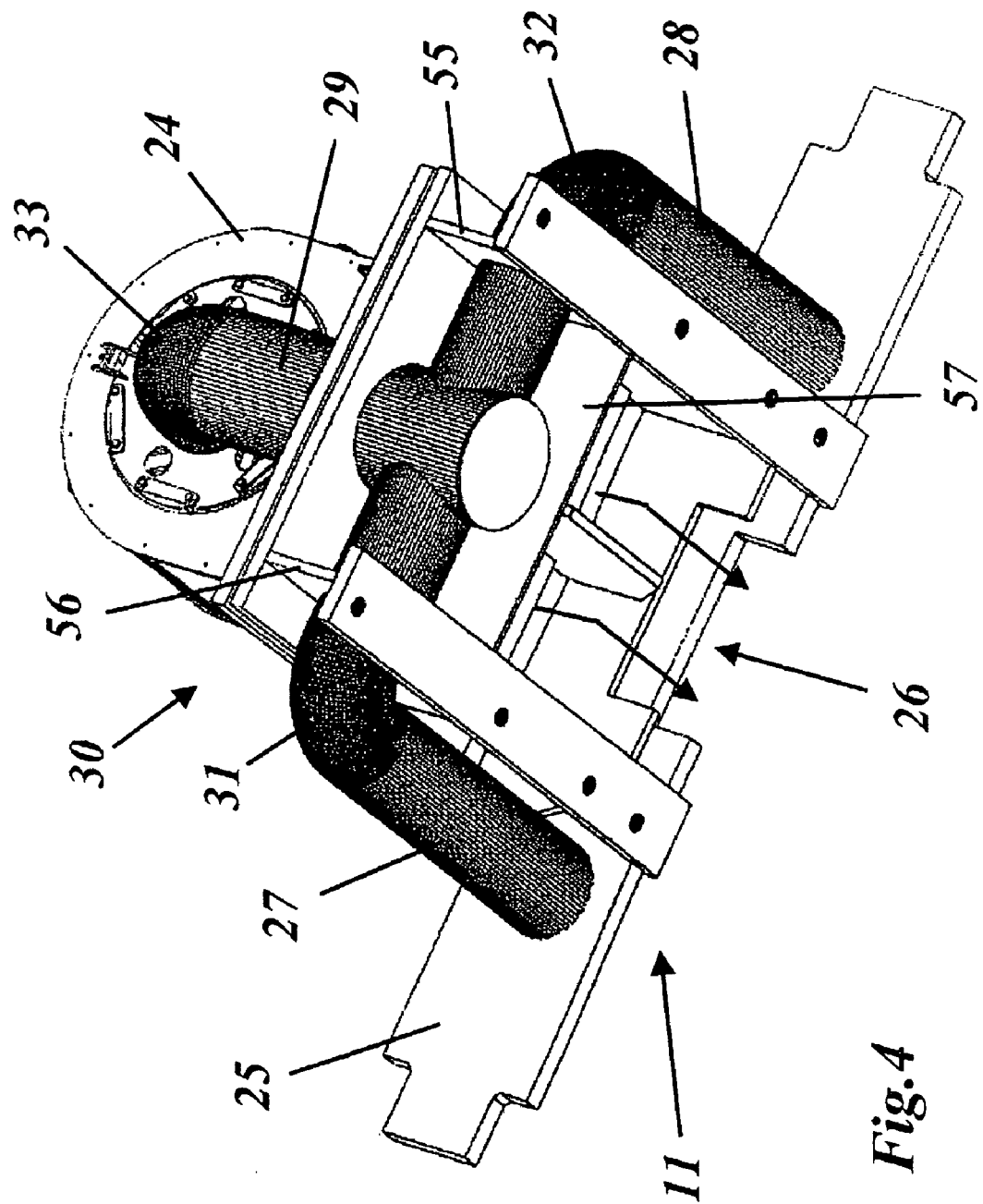
FIG. 4 shows a detail, seen from below, of the cooling-air supply, implemented by tubes, to the exciter, according to an exemplary embodiment of the invention.
Figure 5:
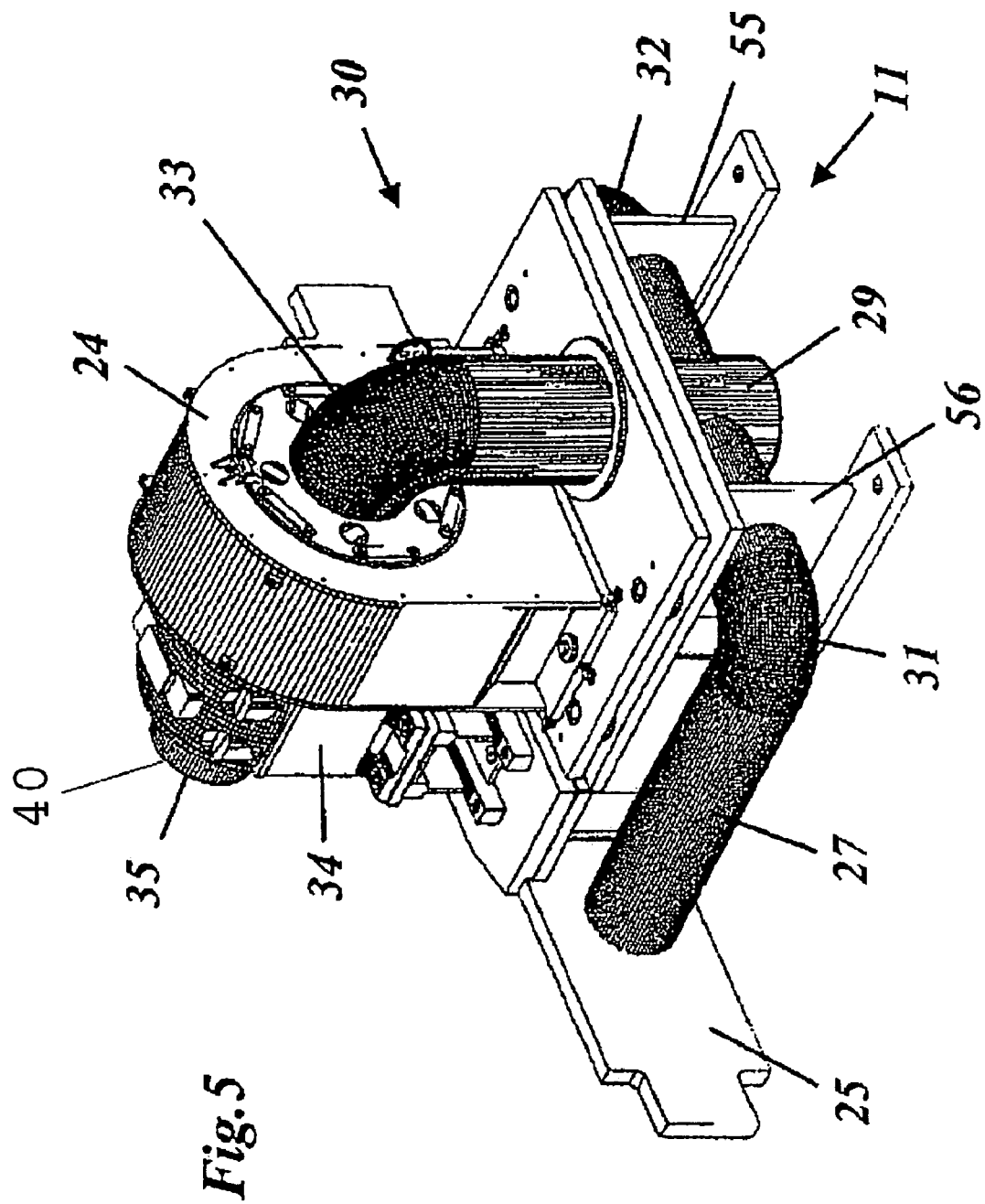
FIG. 5 shows the exemplary embodiment of FIG. 4, as seen obliquely from above.

FIGS. 4 and 5 reproduce an exemplary embodiment of the invention, as seen from various viewing directions. Of the generator 30, only a part of the base frame 11 is shown which carries the exciter 24 and the adjacent bearing block 34 for the generator shaft 35 which indicates the rotor 40 of the generator. This part of the base frame 11 includes the transverse wall 25 and also the two intermediate walls 55 and 56 extending in the longitudinal direction and the intermediate wall 57 which subdivides the middle cavity below the exciter 24. For supplying the cooling air to the exciter 24, then, special tubes 27, 28 and 29 and tube elbows 31, 32, 33 are provided, which lead the cooling air within the base frame 11 laterally past the exciter 24 (tubes 27, 28), combine it in a vertical tube 29 and lead it out of the base frame 11 upward and feed it axially into the exciter 24 by means of the tube elbow 33. After cooling, the cooling air passes out of the exciter 24 downward into the middle part cavity delimited outwardly by the intermediate wall 57 and flows through the cutout 26 in the transverse wall 25 back into the stator region of the base frame 11 (see the flow arrows in FIG. 4).

In the case of the tube-guided cooling of the exciter 24, as proposed in FIGS. 4 and 5, the cooling air, after the cooling of the winding overhangs of the generator, enters the exciter via the tubes 27, 28, 29 and, after flowing through the exciter, is led back to the coolers of the generator. By as many tubes as possible being used for routing the cooling air from and to the exciter 24, the pressure loss of the cooling air can be reduced considerably and consequently the cooling can be improved. Comparative calculations yielded the result that, in the case of a tube-guided cooling-air flow on only one side of the exciter 24 (for example, by means of the tube 27), with a tube diameter of 380 mm, with an inlet pressure at the tube 27 of 2873 Pa and with an outlet pressure at the inlet of the exciter 24 of 1667 Pa, the airstream through the tubes can be increased from 1.87 $m^3$/s by approximately 53% to 2.9 $m^3$/s. The following points must in this case be borne in mind:

the tubes may also have other shapes (for example rectangular or triangular, etc.) in addition to the circular cross-sectional shape shown in FIGS. 4 and 5, the hydraulic diameter of the tubes should be as large as possible (in the case of a predetermined geometry of the base frame 11), the radius of curvature of the tube elbows, which depends on the available space, should be as large as possible, the tubes may be screwed or welded in the base frame 11, in the case of smaller exciters, it may be sufficient to lead the cooling air past on only one side (tube 27 or 28) of the exciter.

What is claimed is:

1. A gas-cooled generator comprising:
a rotor rotatable about an axis;
a stator surrounding the rotor concentrically;
a rotating exciter connected to the rotor;
a common base frame forming a base portion of the gas-cooled generator, wherein the rotor, stator and exciter are disposed along the axis on top of the common base frame, and wherein at least the stator and the exciter are carried from underneath by the base frame; and
at least one tube disposed in the base frame, routing a cooling gas to the exciter.

2. The generator as recited in claim 1, wherein the at least one tube includes a first tube and a second tube and wherein the cooling gas is routed by the first tube to the exciter in an axial direction on a first axial end of the exciter facing away from the rotor, and wherein the cooling gas is routed by the second tube past the exciter on at least one side in the axial direction in the base frame.

3. The generator as recited in claim 2, wherein the at least one tube includes a plurality of tubes and wherein the cooling gas is led past the exciter in the axial direction on both sides in the base frame via at least two of the plurality of tubes.

4. The generator as recited in claim 3, wherein the at least two tubes terminate within the base frame on the first end of the exciter into a common third tube that leads out of the base frame upward toward the exciter.

5. The generator as recited in claim 1, wherein the at least one tube includes a plurality of differently oriented tubes, wherein the generator further comprises a plurality of curved elbows connecting the differently oriented tubes, and wherein a radius of curvature of each of the tube elbows is adapted to a predetermined geometry of the base frame.

6. The generator as recited in claim 1, wherein a hydraulic diameter of the at least one tube is adapted to a predetermined geometry of the base frame.

7. The generator as recited in claim 1, wherein the at least one tube has a round cross section.

8. The generator as recited in claim 1, wherein the at least one tube is attached to the base frame.

9. The generator as recited in claim 8, wherein the at least one tube is attached by at least one of a screw connection and a weld connection.

10. The generator as recited in claim 1, wherein the at least one tube delivers the cooling gas to the excited at an axial end of the exciter.

11. A gas cooled generator comprising:
a rotor rotatable about an axis;
a stator surrounding the rotor concentrically;
a rotating exciter connected to the rotor;
a common base frame, wherein the rotor, stator and exciter are disposed along the axis on the common base frame; and
a plurality of tubes disposed in the base frame, routing a cooling gas to the exciter;

wherein at least two of the plurality of tubes route the cooling gas past the exciter in the axial direction on both sides of the base frame and in approximately the same direction; and wherein at least two of the plurality of tubes are connected by at least one curved elbow.

12. The generator as recited in claim 11, wherein the plurality of tubes includes a first tube and a at least two second tubes and wherein the cooling gas is routed by the first tube to the exciter in an axial direction on a first end of the exciter facing away from the rotor, and wherein the cooling gas is routed by the at least two second tubes past the exciter on both sides in the axial direction in the base frame.

13. The generator as recited in claim 11, wherein the at least two tubes terminate within the base frame on the first end of the exciter into a common third tube that leads out of the base frame upward toward the exciter.

14. The generator as recited in claim 11, wherein the plurality of tubes includes a plurality of differently oriented tubes, wherein the at least one curved elbow includes a plurality of curved elbows, and wherein a radius of curvature of each of the tube elbows is adapted to a predetermined geometry of the base frame.

15. The generator as recited in claim 11, wherein a hydraulic diameter of at least one of the plurality of tubes is adapted to a predetermined geometry of the base frame.

16. The generator as recited in claim 11, wherein at least one of the plurality of tubes has a round cross section.

17. The generator as recited in claim 11, wherein at least one of the plurality of tubes is attached to the base frame.

18. The generator as recited in claim 17, wherein at least one of the plurality of tubes is attached by at least one of a screw connection and a weld connection.

* * * * *